United States Patent
Hause

[11] 3,792,630
[45] Feb. 19, 1974

[54] LOW TORQUE SHIFT CONTROLS FOR TRANSMISSIONS

[75] Inventor: Gilbert K. Hause, Bloomfield Hills, Mich.

[73] Assignee: General Motors Corporation, Detroit, Mich.

[22] Filed: Nov. 24, 1972

[21] Appl. No.: 309,139

[52] U.S. Cl.................. 74/860, 74/851, 123/117 A
[51] Int. Cl..... B60k 21/00, B60k 19/00, F02p 5/04
[58] Field of Search ............. 74/843, 851, 860, 852; 123/117 A

[56] References Cited
UNITED STATES PATENTS

| | | | |
|---|---|---|---|
| 3,742,785 | 7/1973 | Buck et al...................... | 123/117 A |
| 3,626,455 | 12/1971 | Toda et al............................ | 74/860 |
| 3,327,553 | 6/1967 | Peras................................... | 74/852 |
| 3,162,184 | 12/1964 | Walker........................... | 123/117 A |
| 2,809,619 | 10/1957 | Norris.............................. | 123/117 A |
| 2,741,350 | 4/1956 | Dodge................................. | 74/851 |

Primary Examiner—Allan D. Herrmann
Assistant Examiner—P. S. Lall
Attorney, Agent, or Firm—Charles R. White

[57] ABSTRACT

When the shift lever of a geared transmission is moved to change the gear ratio, a solenoid is energized to rotate the engine ignition distributor to a maximum spark retard position reducing engine torque to an operating minimum during the shift transition. As the shift is completed the solenoid is deenergized so that the distributor is adjusted to a spark advance position providing the appropriate firing of the combustion chambers for good engine performance.

3 Claims, 3 Drawing Figures

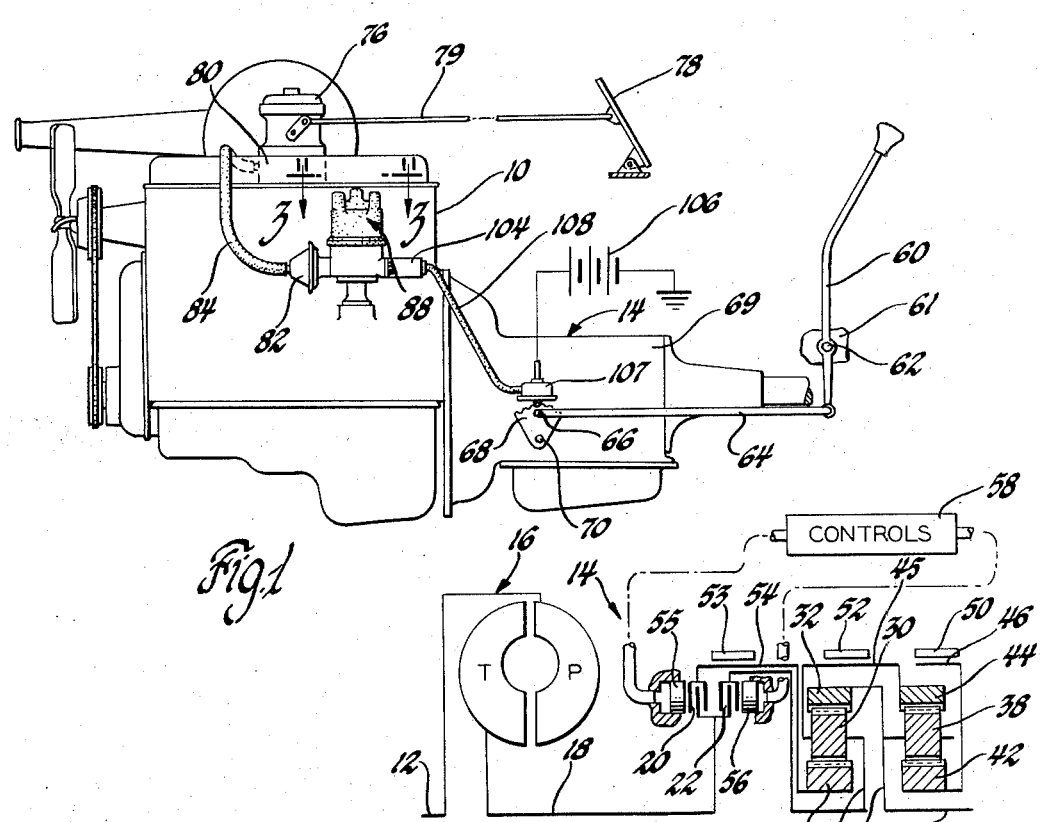
Fig.1
Fig.2
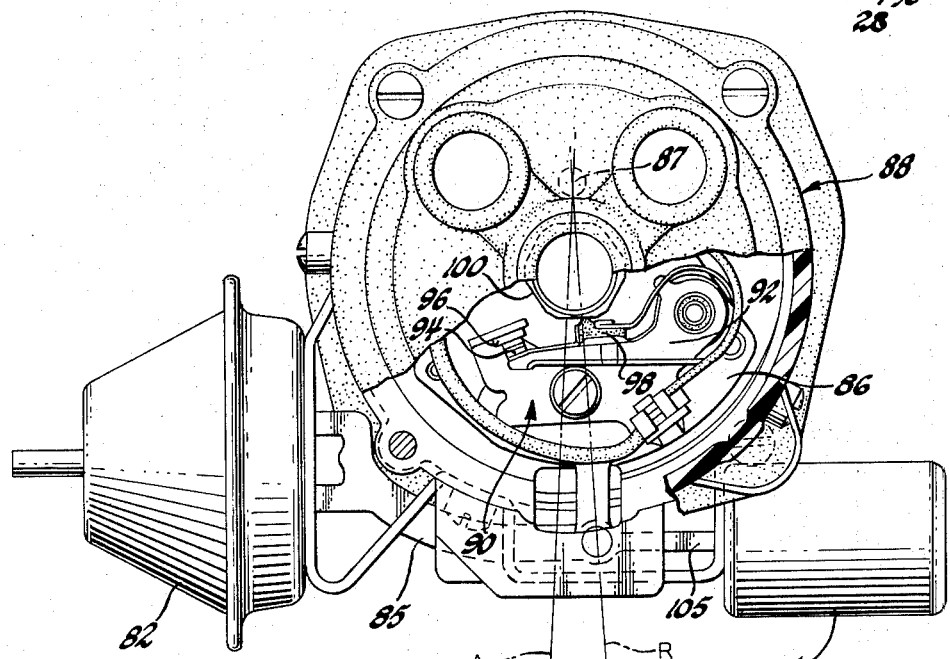
Fig.3

LOW TORQUE SHIFT CONTROLS FOR TRANSMISSIONS

This invention relates to engine-transmission power packages and more particularly to low torque shift controls for change speed transmissions.

In many economy type vehicles such as the compact low-power-to-weight passenger cars there has been increased usage of torque converter and fluid coupling transmissions with change speed planetary gearing. These transmissions usually have intricate hydraulic controls for automatic speed ratio change. While the employment of such transmissions in smaller vehicles has been generally satisfactory, the expense of the automatic transmission has materially increased the cost of the vehicle.

In this invention, simplified and economical manual controls are provided for a torque converter or fluid coupling transmission having planetary gearing to provide a more economical power package for economy type vehicles. The torque output of the engine is reduced during shift transition by this invention to increase the service life of the brakes and clutches controlling the transmission gearing. These controls, being manually operable, eliminate hydraulic controls such as the governor valve, the shift valve and the throttle valve used in automatic change speed transmissions.

In a preferred embodiment of the invention a manually operated shift lever, operatively connected to hydraulic controls, is moved to predetermined positions to effect a geared ratio change. Solenoid means are energized on the initiation of a gear change to rotate a breaker plate of an ignition distributor to a spark retard position so that there is decreased torque developed by the engine pistons during the shift, thereby providing for smooth gear changes and long clutch and brake service life. After the shift is completed, the spark is advanced to the appropriate setting for maximum efficiency of engine operation. With this invention the main clutch and synchronized gearing of prior transmissions are eliminated and replaced by hydraulically actuated clutches and brakes for smooth ratio changes.

These and other features, objects and advantages of this invention will become more apparent from the following detailed description and drawing in which:

FIG. 1 is a side elevational view of a vehicle power package.

FIG. 2 is a diagrammatical view of the upper half of a gear change speed transmission.

FIG. 3 is a view taken generally along lines 3—3 of FIG. 1.

In FIG. 1 there is shown a reciprocating piston engine 10 which has an output that is drivingly connected to the input 12 of a transmission 14 shown diagrammatically in FIG. 2. This transmission has a hydrodynamic fluid coupling 16 with a bladed pump P driven by input 12 and a bladed turbine T. The turbine T is connected by a turbine shaft 18 to the input of separate first and second multi-plate clutches 20 and 22. The clutch 20 is for first, third and reverse drives and is drivingly connected to a sun gear 24 of a first planetary gearset. Clutch 22 is for second, third and fourth range drives and is drivingly connected to a carrier 28 supporting planet gears 30 that mesh with the sun gear 24 and with a ring gear 32 of the first planetary gearset. Ring gear 32 is drivingly connected to the transmission output 34 and to a carrier 36 of a second planetary gearset. This carrier rotatably supports planet gears 38 that mesh with a sun gear 42 and with a ring gear 44. The ring gear 44 is drivingly connected by a drum 45 to the carrier 28 of the first planetary gearset. The sun gear 42 of the second planetary gearset is connected to a drum 46 which is selectively engageable by a friction band 50 to condition the planetary gearing for first and second forward drive ratios. A reverse drive friction band 52 is selectively engageable with a drum 45 to condition the planetary gearset for reverse. A fourth range friction band 53 is selectively engageable with a drum 54 that is connected to the sun gear 24 to condition the gearing for a fourth range forward drive.

The bands and clutches are selectively applied by hydraulically operated servos such as piston 55 for clutch 20 and piston 56 for clutch 22 in response to the positioning of a selector valve in hydraulic control 58, by shift lever 60. The shift lever 60 is mounted for limited pivotal movement on a support 61 in a vehicle by pivot 62. The lower end of the lever 60 is pivotally connected to a link 64 that extends alongside of the transmission and terminates in a pivotal connection 66 with a detent plate 68. The detent plate is mounted for limited rotation on the transmission case 69 by a manual shaft 70. Manual shaft 70 extends into the interior of the transmission case and is drivingly connected to a conventional manual valve in controls 58 that controls the feed and exhaust of pressure oil to the servos actuating the various clutches and brakes. Thus, by turning the shift lever 60 on pivot 62 the shift valve is moved to different positions to effect the selective engagement and disengagement of the various clutches and bands so that the transmission is manually shifted between the forward drive ratios, neutral and reverse.

For optimum clutch and brake service life this invention has provision for the reduction of engine torque during shift transition. As shown, the engine 10 has a conventional carburetor 76 with a throttle valve which controls the fuel-air mixture fed to the cylinders. The carburetor throttle opening is controlled by the vehicle operator through a conventional throttle pedal 78 and linkage 79. The intake manifold 80 of the carburetor is pneumatically connected to a vacuum control assembly 82 by a hose 84. The vacuum control assembly is also of conventional construction and has a spring loaded diaphragm such as disclosed in U.S. Pat. No. 3,072,758 issued Jan. 8, 1963 to Gribben et al, which is connected to a link 85. As shown, link 85 is connected to a breaker plate 86 of an ignition distributor 88 that controls the firing of the engine spark plugs. The breaker plate 86 is supported for limited turning movement in the distributor by pivot 87 and carries a contact set 90 having a pivotally mounted breaker arm 92 with the contact 94. The contact 94 cooperates with a fixed contact 96 and the breaker arm 92 has a rubbing block 98 that engages a cam member 100. The cam member 100 is driven by the distributor shaft not shown and causes the breaker contact to open and close in synchronism with operation of the engine.

The breaker plate 86 is adapted to be turned with respect to cam member 100 by the vacuum control assembly 82 so that the vacuum conditions occurring during engine operation will provide appropriate signals for advancing the spark. For example, at wide open throttle there is little or no vacuum and accordingly the diaphragm is not actuated by atmospheric pressure so that there is no spark advance. At part throttle, however, part of the fuel air mixture is throttled off and there is increased vacuum occurring within the carburetor so that atmospheric pressure pushes the diaphragm compressing the return spring of control assembly 82. When this happens the link 85 is pulled and the breaker plate 86 is turned to a predetermined position indicated by position line A so that the contacts are opened and closed earlier to thereby advance the spark.

With this invention there are means to retard the spark for all throttle positions as the transmission shifts are being made to reduce the output torque of the engine so that the shift transition takes place under low torque conditions. As shown in FIG. 3, the breaker plate 86 is also operatively connected to a solenoid 104 by a rod 105. The solenoid is energized by current from the vehicle battery 106 when switch 107 is closed so that rod 105 is pulled to turn the breaker plate to a predetermined spark retard position indicated by position line R. The switch 107 is electrically connected to the battery and to the solenoid by conductor 108. The switch is secured to the transmission case 69 and has a contact which opens and closes as it rides over the camming lobes formed on detent plate 68. When the switch is closed the solenoid will be energized to retract rod 105 to turn the breaker plate to the spark retard position so that combustion chamber fire is late and most of the energy is dissipated through the exhaust valves and not developed as crankshaft torque.

For example, as the shift lever 60 is moved from first to second to disengage clutch 20 and engage clutch 22 the camming lobe between first and second forward of the detent plate will move the contact upward to close switch 107 to energize the solenoid 104. With the solenoid energized, the breaker plate 86 is turned to a spark retard position so that there is a low torque engine output. As the shift is completed, the switch contact enters the notch between two adjacent lobes and the switch is again opened so that the breaker plate is returned to a setting controlled by the vacuum diaphragm assembly. The distributor may have additional controls such as a conventional centrifugal advance mechanism which provides spark advance as engine speed increases. The solenoid 104 provides sufficient force to move the distributor to a maximum retard position for all engine speeds during a shift transition.

While a preferred embodiment of the invention has been shown and described in detail to illustrate the invention, various changes and modifications may be made without departing from the scope of the invention set forth in the following claims.

I claim:

1. In a shift control for an engine-transmission power package comprising an internal combustion engine having an ignition distributor with operator means for selectively advancing and retarding the timing of engine ignition, a change speed transmission, shift lever means operatively connected to said transmission and movable to predetermined positions for changing the transmission gear speed ratios, actuator means operatively connected to said shift lever means and to said operator means and responsive to movement of said shift lever means between said predetermined positions to actuate said operator means for retarding the timing of engine ignition and thereby reducing engine torque to an operating minimum during the shift transition.

2. In a shift control for an engine-transmission power package comprising an internal combustion engine having an ignition distributor with movable breaker plate means for selectively advancing and retarding the timing of engine ignition, motor means for moving said breaker plate means to an ignition retard position, a power transmission having a change speed gear unit, shift lever means operatively connected to said transmission and movable to predetermined positions for changing the gear unit speed ratios, actuator means operatively connected to said shift lever means and to said motor means and responsive to movement of said shift lever means between said predetermined positions to actuate said motor means to move said breaker plate means and retard the timing of engine ignition and thereby reduce engine torque to an operating minimum during the shift transition.

3. In a shift control for an engine-transmission power package comprising an internal combustion engine having an ignition distributor with operator means for selectively advancing and retarding the timing of engine ignition, a transmission, said transmission having a hydrodynamic fluid unit driven by said engine and a change speed gear unit driven by said fluid unit, a plurality of selectively engageable friction drive establishing devices operatively connected to said gear unit for changing the gear ratio thereof; hydraulic control means for effecting the engagement of said friction drive establishing devices, shift lever means operatively connected to said hydraulic control means and movable to predetermined positions for changing the transmission gear speed ratios, actuator means operatively connected to said shift lever means and to said operator means and responsive to movement of said shift lever means between said predetermined positions to actuate said operator means for retarding the timing of engine ignition and thereby reduce engine torque to an operating minimum during the shift transition.

* * * * *